United States Patent [19]

Breuer

[11] 4,109,746

[45] Aug. 29, 1978

[54] DEVICE FOR BLOCKING THE STARTING OF VEHICLE ENGINES WITH ELECTRIC STARTER

[75] Inventor: Bert Breuer, Troisdorf, Fed. Rep. of Germany

[73] Assignee: Klöckner-Humboldt-Deutz Aktiengesellschaft, Cologne, Fed. Rep. of Germany

[21] Appl. No.: 733,082

[22] Filed: Oct. 18, 1976

[30] Foreign Application Priority Data

Oct. 16, 1975 [DE] Fed. Rep. of Germany ....... 2546286

[51] Int. Cl.[2] ............................................ B60K 28/00

[52] U.S. Cl. ............................ 180/82 A; 123/179 K; 200/61.88

[58] Field of Search ................ 180/82 A, 82 R, 77 R; 123/179 K; 200/61.91, 61.88; 74/473 R

[56] References Cited

U.S. PATENT DOCUMENTS

| | | | |
|---|---|---|---|
| 1,231,637 | 7/1917 | Nikonow | 123/179 K |
| 1,814,950 | 7/1931 | Moscato | 200/61.88 |
| 2,177,151 | 10/1939 | Ross | 123/179 K |

*Primary Examiner*—John A. Pekar

*Attorney, Agent, or Firm*—Walter Becker

[57] ABSTRACT

A device for blocking the starting of a vehicle engine equipped with an electric starter, in which the engine transmission includes at least one speed range shift lever and at least one group shift lever which levers are respectively guided in two gear shifting gates arranged along about the same plane. The speed range shift lever slots and the group shift lever slots extend substantially at a right angle to neutral control slots which latter extend in one and the same direction. There is provided a shift plate which covers both gear shifting gates and slot-shaped openings exist therewith for the passage of the two shift levers. These slot-shaped openings extend in the longitudinal direction of and at least over the length of the neutral control slots. The shift plate has a bearing which is shiftable about a vertical axis and the pivot pin of which bearing is journalled in an oblong opening extending transverse to said neutral control slots. An electric start blocking switch associated with the starter device becomes effective in a first control position of the shift plate, to close the circuit for the starter and becomes ineffective in a second position of the shift plate.

3 Claims, 2 Drawing Figures

FIG.1
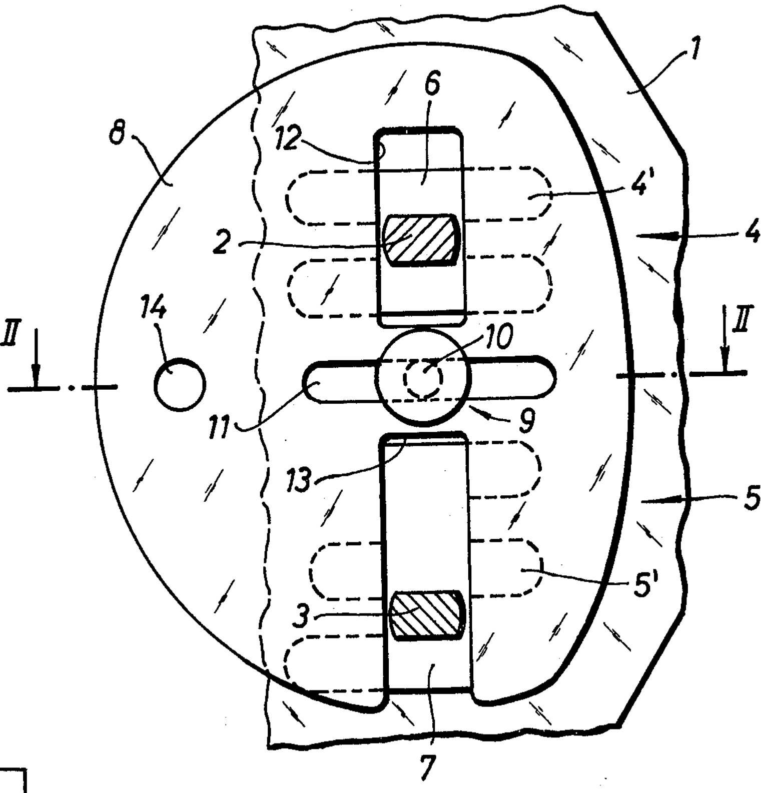
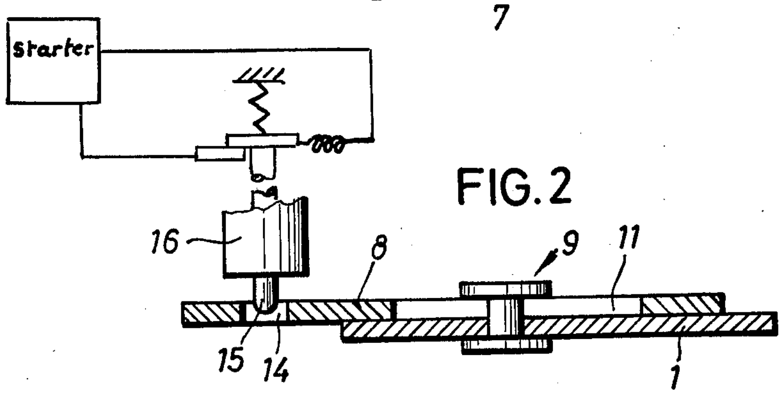
FIG.2

DEVICE FOR BLOCKING THE STARTING OF VEHICLE ENGINES WITH ELECTRIC STARTER

,

The present invention relates to a start-blocking device for a motor vehicle, the engine of which is equipped with an electric starting device and the transmission of which is equipped with at least one speed shift lever and a group shift lever which are adjacent to each other respectively guided in a gear shifting gate at approximately the same plane. The said speed and group shifting slots are arranged substantially at a right angle to the netural control slots extending in one direction.

In order to avoid accidents by starting the engine with the power transmission in engaged position, start-blocking switches are installed in the change gear transmission. These start-blocking switches interrupt the electric circuit for starting the starter as long as a group or a speed of the transmission is in engaged position. With heretofore known devices for solving the above mentioned problem, the element for actuating the start-blocking switch is moved either by the speed lever or by the group shift lever. This means that the transmission part which does not affect the starting block switch may be switched on into the power flow when the switched-in other transmission part keeps the start-blocking switch in blocking position. The drawback of such an arrangement consists in that for instance due to manufacturing tolerances of the actuating elements arranged on the transmission side and pertaining to the start-blocking switch, the blocking effect is not safely assured when patially shifting the transmission part which influences the start-blocking switch.

It is, therefore, an object of the present invention to improve a start-blocking device of the above mentioned general type by simple means so that the above mentioned drawnbacks will be avoided and that the start-blocking device will assure a maximum safety.

These and other objects and advantages of the invention will appear more clearly from the following specification in connection with the accompanying drawing, in which:

FIG. 1 shows the top view of the start-blocking device according to the invention.

FIG.2 is a section taken along the line II—II of FIG. 1.

The start-blocking device according to the invention for a motor vehicle is characterized primarily in that one of the two gear shifting gates is covered by a shift plate which comprises slot-shaped openings for the passage of the two shift levers which slot-shaped openings extend in the longitudinal direction of the neutral control slots and extend at least over the lengths thereof. The start-blocking device according to the invention is furthermore characterized in that the shift plate has a bearing which is pivotable about a vertical axis and the shiftable pivot of which is arranged in an oblong hole which extends transverse to the neutral shift slots. A further characteristic feature of the start-blocking device according to the invention consists in that an electric blocking swithch of the starting device is adapted at a predetermined position of the switch plate to be engaged with or disengaged from the starting device.

Such an arrangement will bring about that both shift levers have to be in their neutral position in order to permit a starting of the engine of the vehicle. Thus, the start-blocking device furnishes a high degree of safety.

According to a further development of the invention, the shift bearing of the shift plate is arranged within the region between the two gear shifting gates, and the oblong hole for the shiftable pivot is located in the shift plate.

Referring now to the drawing in detail, it will be seen that from a support 1 on a non-illustrated driver's place there project two shift levers 2 and 3 from a gear shifting gate 4 and 5 respectively. Both shift levers 2 and 3 serve for actuating the vehicle transmission. One shift lever 3 is provided for the preselection of the desired transmission group whereas the other shift lever 2 serves for shifting the corresponding speed or velocity range. The two gear shifting gates 4 and 5 are so designed and arranged with regard to each other that their speed and group shift slots 4' and 5' extend at a substantially right angle to the idling shift slots 6 and 7. On said support 1 there is provided a shift plate 8 which covers both gear shifting gates 4 and 5 and its central area has a shift bearing 9. The shift bearing 9 comprises a shiftable pivot 10 which engages an oblong hole 11 that extends transverse to the neutral control or shift slots 6 and 7. For the passage of the two shift levers 2 and 3 through the shift plate 8, the latter is provided with two slot-shaped openings 12 and 13 respectively which extend in the longitudinal direction of the neutral shift slots 6 and 7. In the shift plate 8 there is provided a circular recess 14 which is located in the extension of an axis passing through the oblong hole 11. The recess 14 is in conformity with FIG. 2 engaged by a shift pin 15 which is under the preload of a non-illustrated spring and which serves for actuating a blocking switch 16 which is only partially illustrated .

In the illustrated neutral position of the two shift levers 2 and 3, the shift plate 8 is respectively located in a position in which the shift pin 15 engages the recess 14. As a result thereof, the blocking switch 16 is closed, and a starting of the engine of the vehicle is possible. If, however, one shift lever 2 and/or the other shift lever 3 is located outside the illustrated neutral position in one of the shift slots 4' and 5' respectively, the shift pin 15 will be located outside the recess 14 of shift plate 8. In this position of the control pin 15, the blocking switch 16 is open, and thus a starting of the engine of the vehicle will be impossible.

It is, of course, to be understood that the present invention is, by no means, limited to the specific showing in the drawing but also comprises any modifications within the scope of the appended claims.

What I claim is :

1. A vehicle engine having an electric starter, and a transmission including at least one speed range shift lever and one group shift lever and two gear shifting gates spaced from each other respectively guiding said levers and arranged along substantially the same plane, said gear shifting gates including spaced slots for said at least one speed range shift lever and said at least one group shift lever, said transmission also including neutral control slots extending in one and the same direction, and said spaced slots for said at least one speed range shift lever and said at least one group shift lever extending at a substantially right angle to said neutral control slots, in combination with a shift plate covering said two gear shifting gates and provided with slot-shaped openings for the passage therethrough of said two shift levers, said slot-shaped openings extending in the longitudinal direction of and at least over the length of said neutral control slots, journalling means about which said shift plate is pivotable in a vertical axis and comprising a fixed vertical pivot pin, means defining an oblong opening extending transverse to said slot-shaped openings also to permit shifting of said shift plate and having said pivot pin journalled therein, and electric control switch means operatively connected to said shift plate and operable in response to said shift plate moving into a first position relative to said control switch means corresponding to positioning of each of said levers in a neutral control slot to deactivate said starter.

2. The combination according to claim 1, in which said journalling means of said shift plate are located within the region between said two gear shifting gates, and in which said oblong opening for said pivot pin is arranged in said shift plate.

3. The combination according to claim 2, in which said oblong opening is located between said slot-shaped openings and extends in a direction transverse to the longitudinal direction of said slot-shaped openings.

* * * * *